(12) United States Patent
Valente

(10) Patent No.: US 7,232,399 B2
(45) Date of Patent: **\*Jun. 19, 2007**

(54) DIFFERENTIAL ASSEMBLY

(75) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,389

(22) Filed: Oct. 20, 2006

(65) Prior Publication Data

US 2007/0037656 A1 Feb. 15, 2007

Related U.S. Application Data

(63) Continuation of application No. 11/343,855, filed on Jan. 31, 2006, now Pat. No. 7,147,585, which is a continuation of application No. 10/794,780, filed on Mar. 5, 2004, now Pat. No. 7,022,041.

(51) Int. Cl.
*F16H 48/06* (2006.01)

(52) U.S. Cl. .................. 475/252; 475/230; 475/248; 74/606 R; 74/607

(58) Field of Classification Search ............ 475/248, 475/249, 252; 74/606 R, 607
See application file for complete search history.

(56) References Cited

U.S. PATENT DOCUMENTS

| | | | |
|---|---|---|---|
| 2,269,734 A | 1/1942 | Powell | |
| 3,706,239 A | 12/1972 | Myers | |
| 4,365,524 A | 12/1982 | Dissett | |
| 4,677,876 A | 7/1987 | Dissett | |
| 4,751,853 A | 6/1988 | Dissett | |
| 5,055,096 A | 10/1991 | Riemscheid et al. | |
| 5,122,101 A | 6/1992 | Tseng | |
| 5,122,102 A | 6/1992 | Chludek et al. | |
| 5,139,467 A | 8/1992 | Carpenter | |
| 5,221,238 A | 6/1993 | Bawks et al. | |
| 5,292,291 A | 3/1994 | Ostertag | |
| 5,342,256 A | 8/1994 | Amborn et al. | |
| 5,389,048 A | 2/1995 | Carlson | |
| 5,492,510 A | 2/1996 | Bowerman | |
| 5,554,081 A | 9/1996 | Bowerman | |
| 5,671,640 A | 9/1997 | Valente | |
| 5,823,907 A | 10/1998 | Teraoka et al. | |
| 5,842,946 A | 12/1998 | Ichiki | |

(Continued)

FOREIGN PATENT DOCUMENTS

DE 4023332 A1 7/1990

(Continued)

*Primary Examiner*—David D. Le
(74) *Attorney, Agent, or Firm*—Harness, Dickey & Pierce, P.L.C.

(57) ABSTRACT

An axle assembly that includes a differential casing, which is rotatable about an axis, a pair of side gears that are disposed within the differential casing, a spacer and a cross pin. The spacer is disposed between the side gears. The cross pin is fixed to the differential casing and extends through the spacer. The cross pin is employed to limit end play of the axle shafts in a direction toward one another. The aperture in the spacer that receives the cross pin is relatively larger than the cross pin so that the spacer can control end play of the side gears independently of the cross pin.

16 Claims, 12 Drawing Sheets

U.S. PATENT DOCUMENTS

| | | |
|---|---|---|
| 5,951,431 A | 9/1999 | Downs et al. |
| 5,983,754 A | 11/1999 | Tyson et al. |
| 5,984,823 A | 11/1999 | Gage |
| 6,053,838 A | 4/2000 | Gage |
| 6,139,462 A | 10/2000 | Gage et al. |
| 6,533,697 B2 | 3/2003 | Morse et al. |
| 6,540,640 B2 | 4/2003 | Hibbler et al. |
| 7,022,041 B2 * | 4/2006 | Valente ................ 475/252 |
| 7,147,585 B2 * | 12/2006 | Valente ................ 475/252 |
| 2002/0025878 A1 | 2/2002 | Kam |

FOREIGN PATENT DOCUMENTS

| | | |
|---|---|---|
| EP | 356401 A2 | 2/1990 |
| GB | 2212231 | 11/1987 |
| JP | 2000110920 | 4/2000 |

* cited by examiner

DIFFERENTIAL ASSEMBLY

CROSS-REFERENCE TO RELATED APPLICATIONS

This is a continuation of U.S. patent application Ser. No. 11/343,855 filed Jan. 31, 2006, now U.S. Pat. No. 7,147,585, which is a continuation of U.S. patent application Ser. No. 10/794,780 filed Mar. 5, 2004, now issued U.S. Pat. No. 7,022,041. The disclosures of the above applications are incorporated herein by reference.

FIELD OF THE DISCLOSURE

The present disclosure relates to differentials for use in automotive drivelines and, more particularly, to a pinion pair arrangement for a four pinion pair, C-clip differential having independent control of side gear endplay and axle shaft endplay.

BACKGROUND OF THE DISCLOSURE

Differentials of the type used in automotive drivelines generally include a planetary gearset supported within a differential casing to facilitate relative rotation (i.e., speed differentiation) between a pair of output shafts. The planetary gearset typically includes helical side gears fixed to the end of the output shafts, which are meshed with paired sets of helical pinion gears. This type of differentiation is known as a parallel axis helical gear differential. In response to input torque applied to the differential case, the torque transmitted through meshed engagement of the side gears and pinion gears generates thrust forces. To accommodate these and other operating forces, the wall surface of the gear pockets and other thrust surfaces of the differential casing must provide adequate support.

In some differentials it is necessary to install C-shaped retainers, or C-clips for restraining and positioning the output shafts in the differentials. To install the C-clips it is necessary to gain access to the interior cavity of the differential casing through an access window arranged on the differential casing.

In general, it is desirable to allow the side gear loading to be spread out evenly around the periphery of the differential. One way to achieve even loading is to position the pinion pairs evenly around the periphery of the differential casing. However, because the access window is arranged on the outer periphery of the differential casing, there tends to be incompatibility issues with placement of the pinion pairs.

SUMMARY OF THE DISCLOSURE

In one form, the present disclosure provides an axle assembly for a vehicle that includes a differential casing, a pair of side gears, a pair of axle shafts, a spacer and a cross pin. The differential casing is rotatable about an axis and includes a first pin aperture. The side gears are disposed within the differential casing. Each axle shaft is coupled for rotation with one of the side gears. The spacer is disposed between the side gears and has a second pin aperture. The cross pin is received into the first and second pin apertures such that receipt of the cross pin into the first pin aperture fixedly but removably couples the cross pin to the differential casing. The size of the second pin aperture is greater than a corresponding size of the cross pin such that the spacer is moveable along the rotational axis of the differential casing relative to the cross pin. As such, the cross pin limits movement of the axle shafts in a direction toward one another and the spacer limits movement of the side gears toward one another independently of the cross pin.

In another form, the present disclosure provides a method that includes: providing a differential casing having a rotational axis; installing a pair of side gears within the differential casing; installing a pair of axle shafts to the side gears such that each axle shaft is coupled for rotation with one of the side gears; locating a spacer between the side gears; fixedly coupling a cross pin to the differential casing such that the cross pin is inserted through a pin aperture in the spacer; and moving the side gears and the spacer in a first direction along the rotational axis without moving the cross pin.

In yet another form, the present disclosure provides an axle assembly for a vehicle that includes a differential casing, a pair of side gears, a pair of axle shafts, a spacer and a cross pin. The differential casing is rotatable about an axis and includes a first pin aperture. The side gears are disposed within the differential casing. Each axle shaft is coupled for rotation with one of the side gears. The spacer is disposed between the side gears and includes a second pin aperture. The cross pin is received into the first and second pin apertures. Receipt of the cross pin into the first pin aperture fixedly but removably couples the cross pin to the differential casing. The size of the second pin aperture is greater than a corresponding size of the cross pin such that a void space is disposed between the spacer and the cross pin regardless of a position of the side gears axially along the rotational axis.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a cross-sectional view of the differential assembly taken along line 4-4 of FIG. 2a;

DETAILED DESCRIPTION OF THE PREFERRED EMBODIMENTS

The following description of the preferred embodiment(s) is merely exemplary in nature and is in no way intended to limit the disclosure, its application, or uses. The differential assembly according to the present teachings may be utilized with a wide variety of applications and is not intended to be specifically limited to the particular application recited herein.

Figure 1:
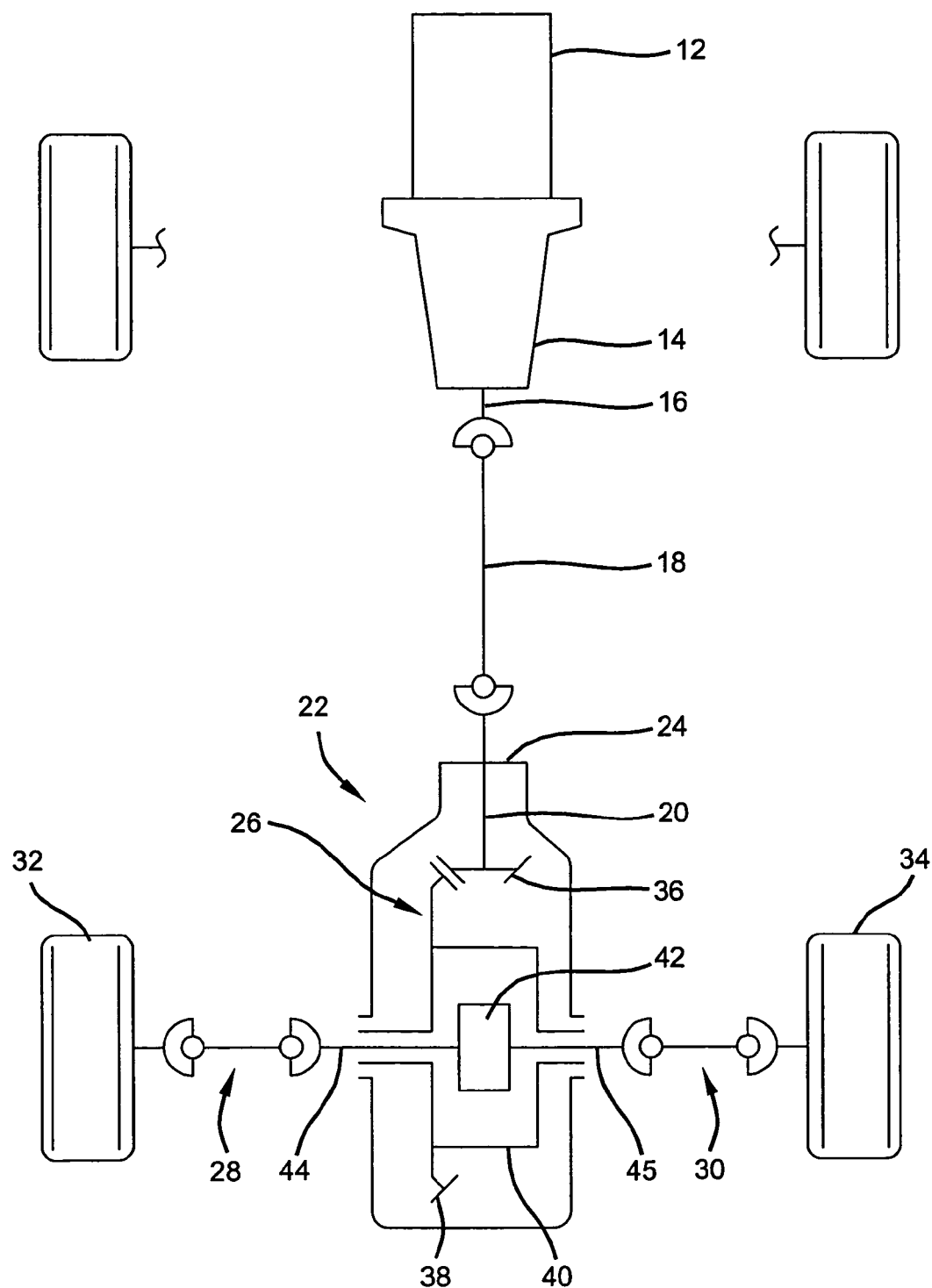
FIG. 1 is a schematic view of an exemplary motor vehicle into which a differential assembly constructed in accordance with the teachings of the present disclosure is incorporated.

With initial reference to FIG. 1, a drivetrain 10 for an exemplary motor vehicle may include an engine 12, a transmission 14 having an output shaft 16, and a propeller shaft 18 connecting the output shaft 16 to a pinion shaft 20 of a rear axle assembly 22. The rear axle assembly 22 includes an axle housing 24, a differential assembly 26 supported in the axle housing 24, and a pair of axle shafts 28 and 30, respectively, interconnected to a left and right rear wheel 32 and 34, respectively. The pinion shaft 20 has a pinion shaft gear 36 fixed thereto which drives a ring gear 38 that may be fixed to a differential casing 40 of the differential assembly 26. A gearset 42 supported within the differential casing 40 transfers rotary power from the casing 40 to a pair of output shafts 44 and 45 connected to the axle shafts 28 and 30, respectively, and facilitates relative rotation (i.e., differentiation) therebetween. While the differential assembly 26 is shown in a rear-wheel drive application, the present invention is contemplated for use in differential assemblies installed in transaxles for use in front-wheel drive vehicles, and/or in transfer cases for use in four-wheel drive vehicles.

Turning now to FIGS. 2a-4, the differential assembly 26 will be described in further detail. The differential assembly 26 may be a parallel-axis helical-gear type differential and includes the differential casing 40, which defines an internal chamber 48. The differential casing 40 includes a main drum or body 46 and an end cap 50, each of which having respective mating radial flanges 52 and 54, respectively. The radial flanges 52 and 54 are secured together by a plurality of bolts (not shown) extending through aligned mounting bores 58. As is known, a ring or bevel gear can be fixed to the radial flange 52 on the differential casing 40 to transfer rotary power (i.e., drive torque) thereto. The differential casing 40 defines a pair of axially aligned openings 60a and 60b in communication with the internal chamber 48. The axially aligned openings 60a and 60b are adapted to receive the end segments of the pair of driving output shafts 44 and 45 (FIG. 1), also referred to as axle shafts.

Figure 3:
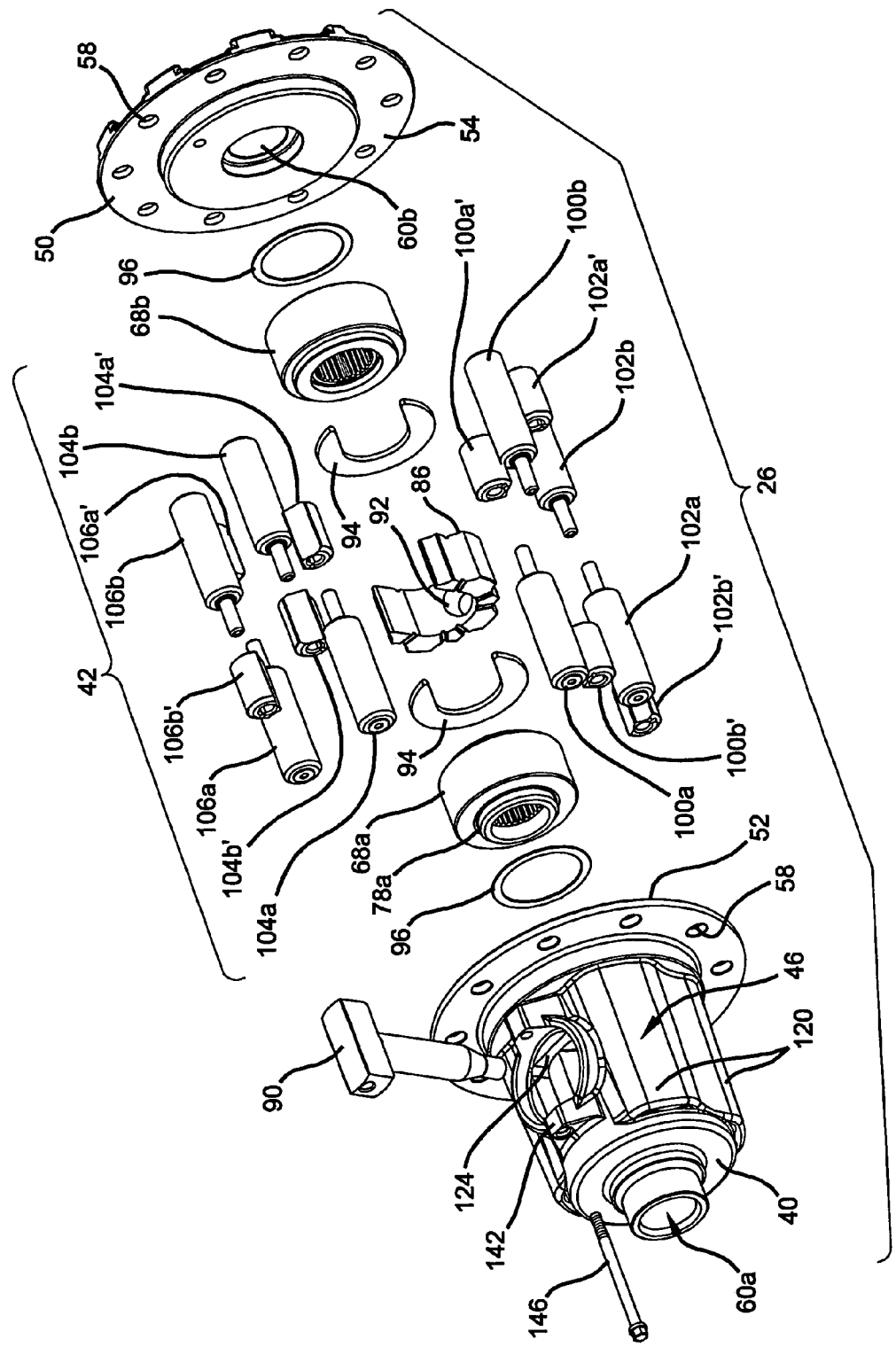
FIG. 3 is an exploded view of the differential assembly of FIG. 1.
Figure 4:
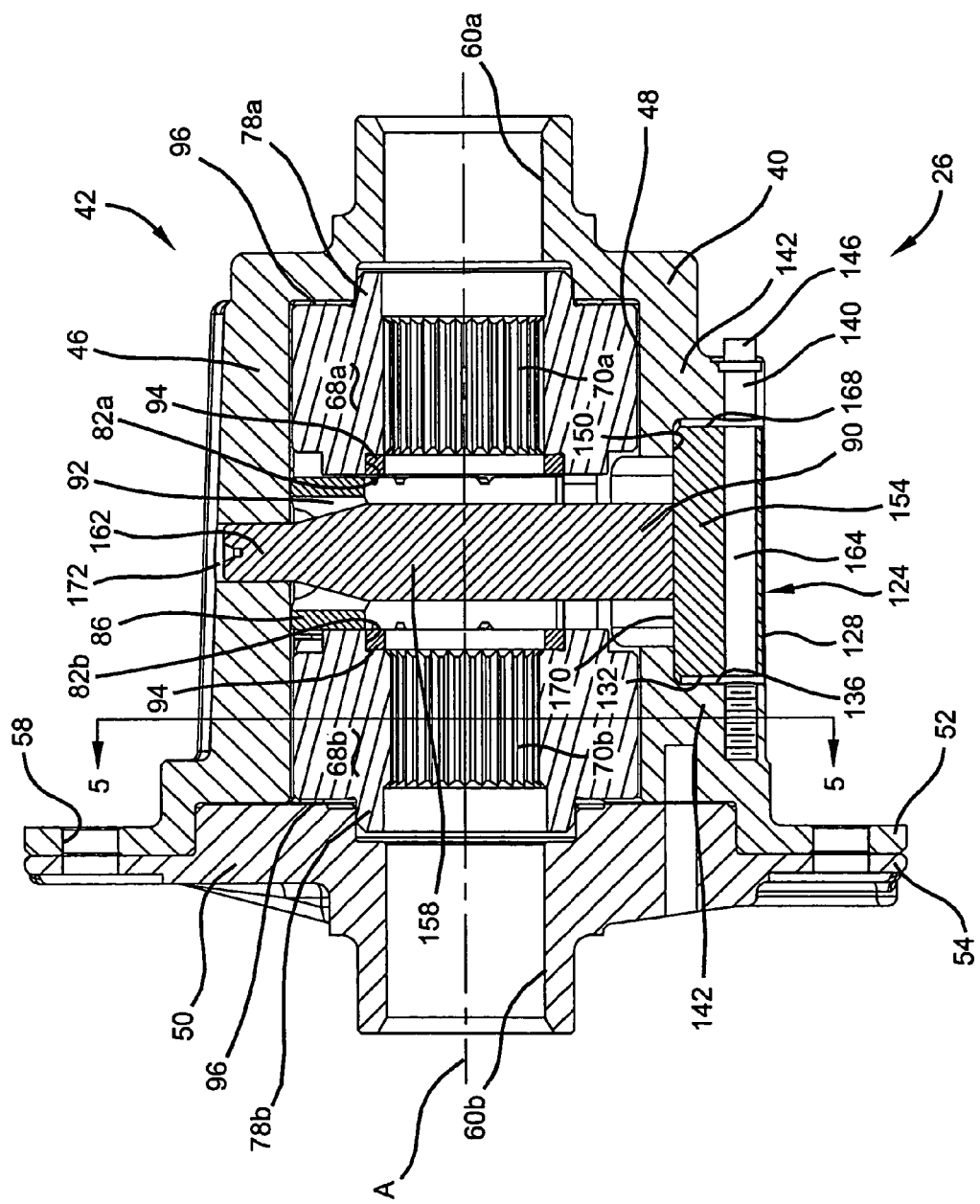

With specific reference to FIGS. 3 and 4, the differential assembly 26 includes the gearset 42 that is operable for transferring drive torque from the differential casing 40 to the output shafts 44 and 45 (FIG. 1) in a manner that facilitates a speed differential therebetween. Gearset 42 may be a helical-type and may be disposed within the internal chamber 48. The gearset 42 includes a pair of side gears 68a and 68b. The side gears 68a, 68b have internal splines 70a and 70b meshed with external splines, not specifically shown, on the corresponding output shafts 44 and 45 (FIG. 1). In addition, the side gears 68a and 68b include axial hubs 78a and 78b, respectively, which are retained in corresponding annular sockets, formed in the main body 46 and the end cap 50 of the differential casing 40, and annular chambers 82a and 82b. As will be described in greater detail below, a spacer 86 may be located between the side gears 68a and 68b for limiting the amount of axial endplay of the side gears 68a and 68b within the differential case 40. A cross pin assembly 90 extends through a clearance passage 92 in the spacer 86 and controls endplay of the axle shafts 44 and 45 (FIG. 1).

C-shaped retainers, or C-clips 94, may be retained in the annular chambers 82a and 82b for preventing the axle shafts 44 and 45, respectively, from becoming disengaged with the side gears 68a and 68b. The side gears 68a and 68b may be bounded at their outer ends by washers 96.

The gearset 42 includes four sets of pinion pairs, 100a and 100b, 102a and 102b, 104a and 104b and 106a and 106b, respectively (FIG. 3). For clarity the pinion pairs 100a and 100b, 102a and 102b, 104a and 104b and 106a and 106b are hereinafter referred to as a first, second, third and fourth pair of pinion gears 100, 102, 104 and 106, respectively. Brake shoes 100a'-106b' cooperate with respective pinion gears 100-106.

Figure 2A:
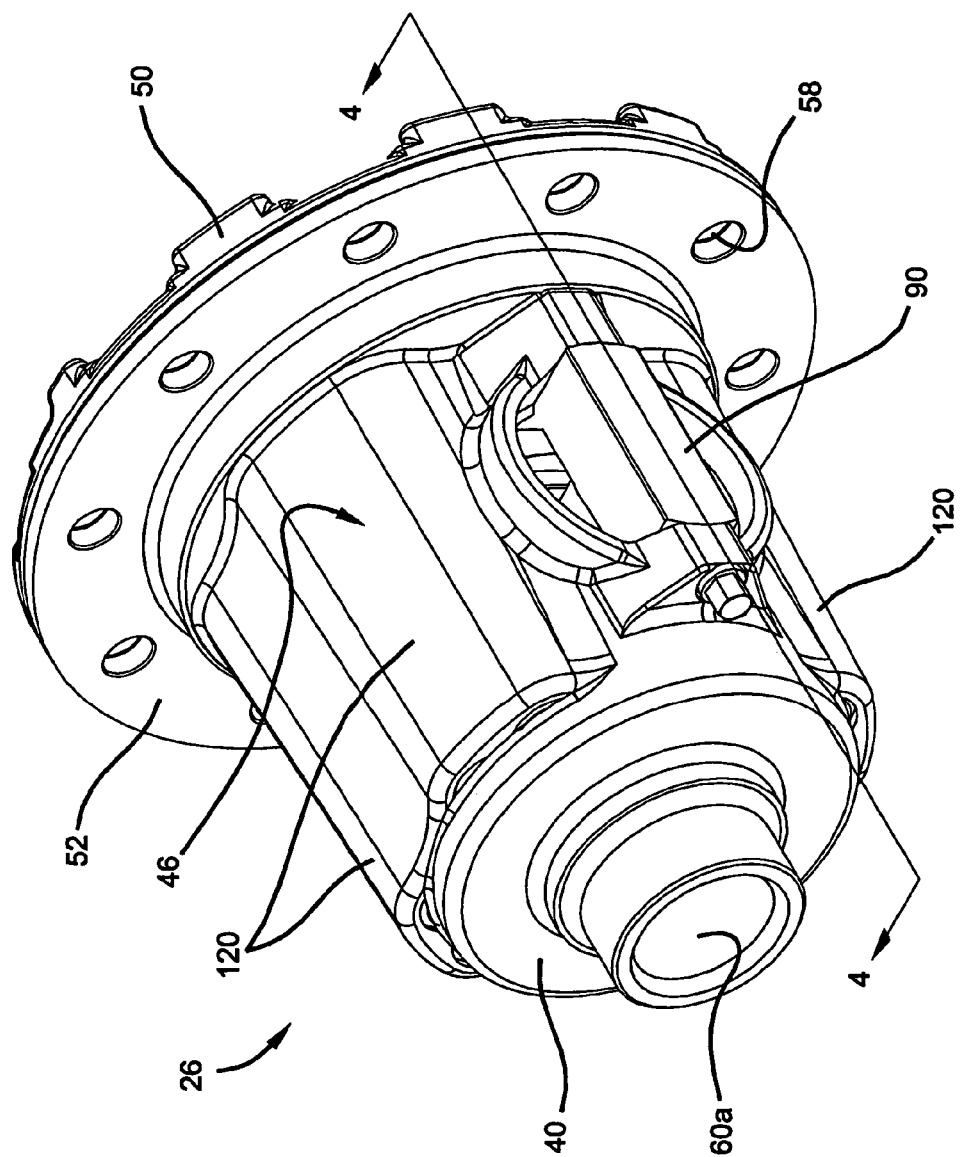
FIG. 2a is a perspective view of the differential assembly of FIG. 1.
Figure 2B:
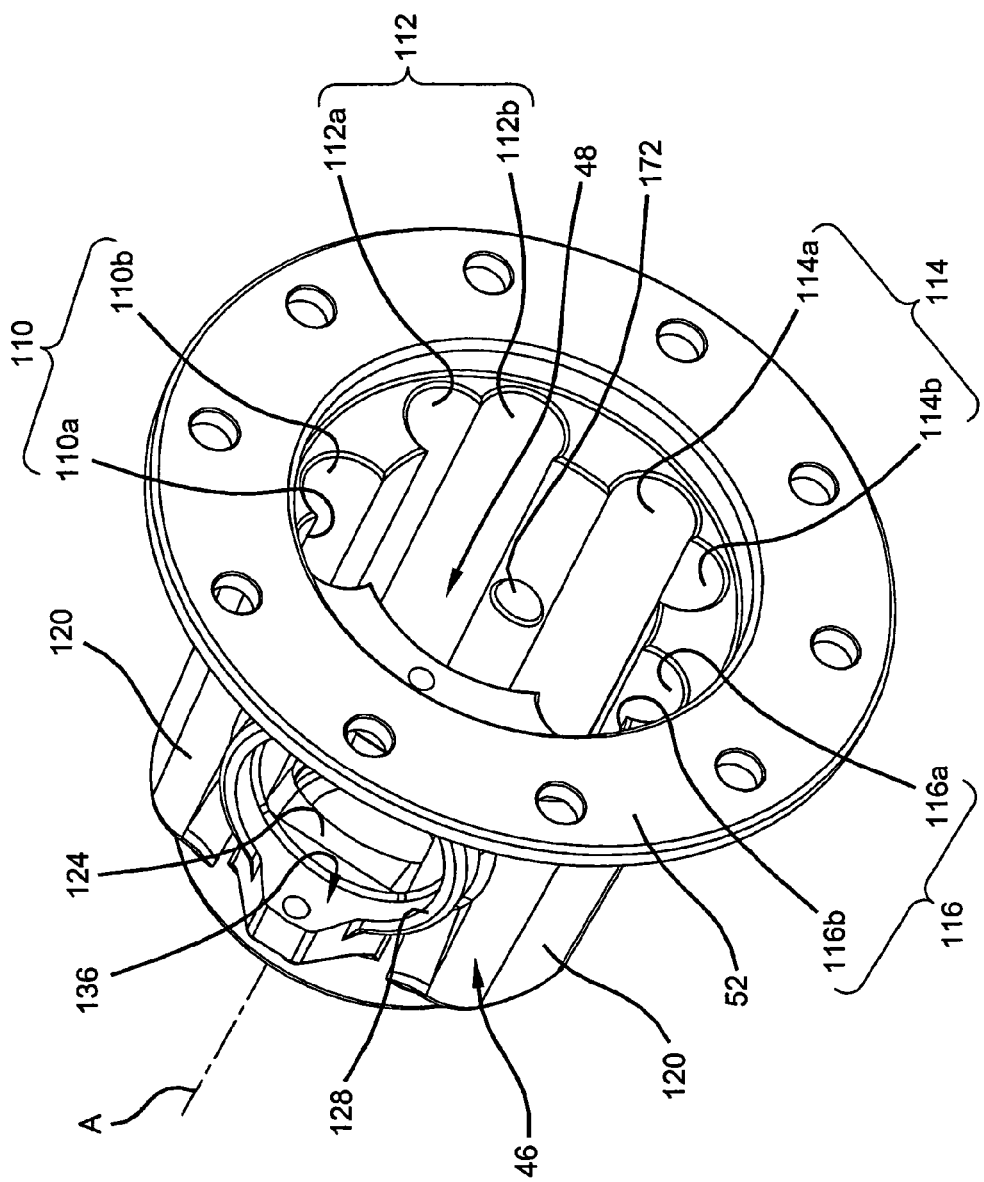
FIG. 2b is a perspective view of the differential casing of FIG. 1.

In FIGS. 2b and 3, the four sets of pinion pairs 100-106 are rotatably supported in complementary sets of pinion bores 110a and 110b, 112a and 112b, 114a and 114b, and 116a and 116b. The complementary sets of pinion bores 110a and 110b, 112a and 112b, 114a and 114b, and 116a and 116b are hereinafter referred to as a first, second, third and fourth pair of pinion bores 110, 112, 114, and 116, respectively. The pinion bores 110-116 are formed in raised hub segments 120 of the main body 46. The pinion bores 110-116 are arranged in paired sets such that they communicate with each other and with the internal chamber 48. In addition, the pinion bores 110-116 are aligned substantially parallel to the rotational axis A of the axle shafts 44 and 45 (FIG. 1). A window opening 124 may be arranged on the differential casing 40 between the first and the fourth pair of pinion gears 100 and 106.

Figure 5:
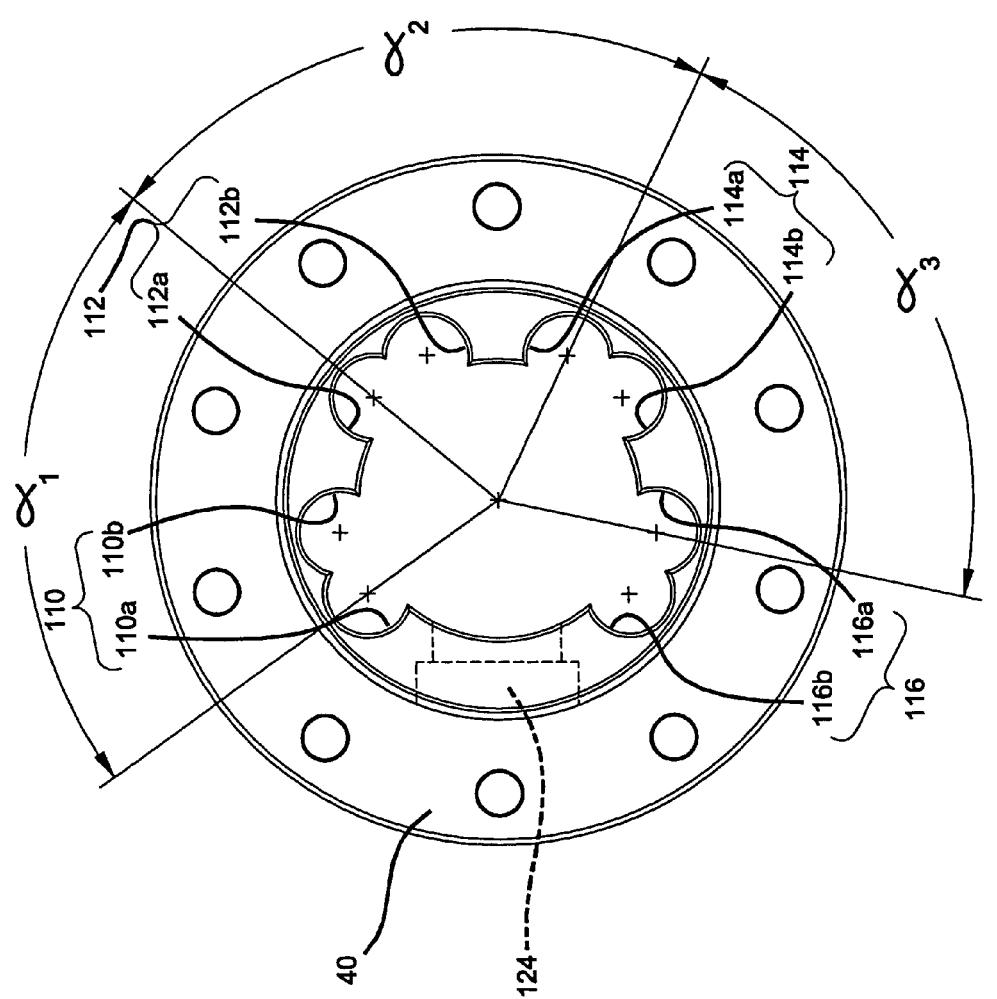
FIG. 5 is a cross-sectional view of the differential assembly taken along line 5-5 of FIG. 4.

With reference now to FIG. 5, the spacial relationship of the pinion pairs will be described. The four pinion bores 110-116, and as a result, the four pinion pairs 100-106 (FIG. 3), are radially spaced evenly around the differential casing 40 opposite the window opening 124. More specifically, the first pair of pinion bores 110 are offset a radial distance $\alpha_1$ from the second pair of pinion bores 112. The second pair of pinion bores 112 are offset a radial distance $\alpha_2$ from the third pair of pinion bores 114. The third pair of pinion bores 114 are offset a radial distance $\alpha_3$ from the fourth pair of pinion bores 116. As illustrated, the respective a distances are taken from the centerline of respective first bores 110a-110d. The radial offsets between the pinion bores 110 and 112, 112 and 114, and 114 and 116 may be approximately equivalent (e.g., $\alpha_1=\alpha_2=\alpha_3$). In the example provided, $\alpha_1$, $\alpha_2$ and $\alpha_3$ are approximately 75 degrees.

Figure 6:
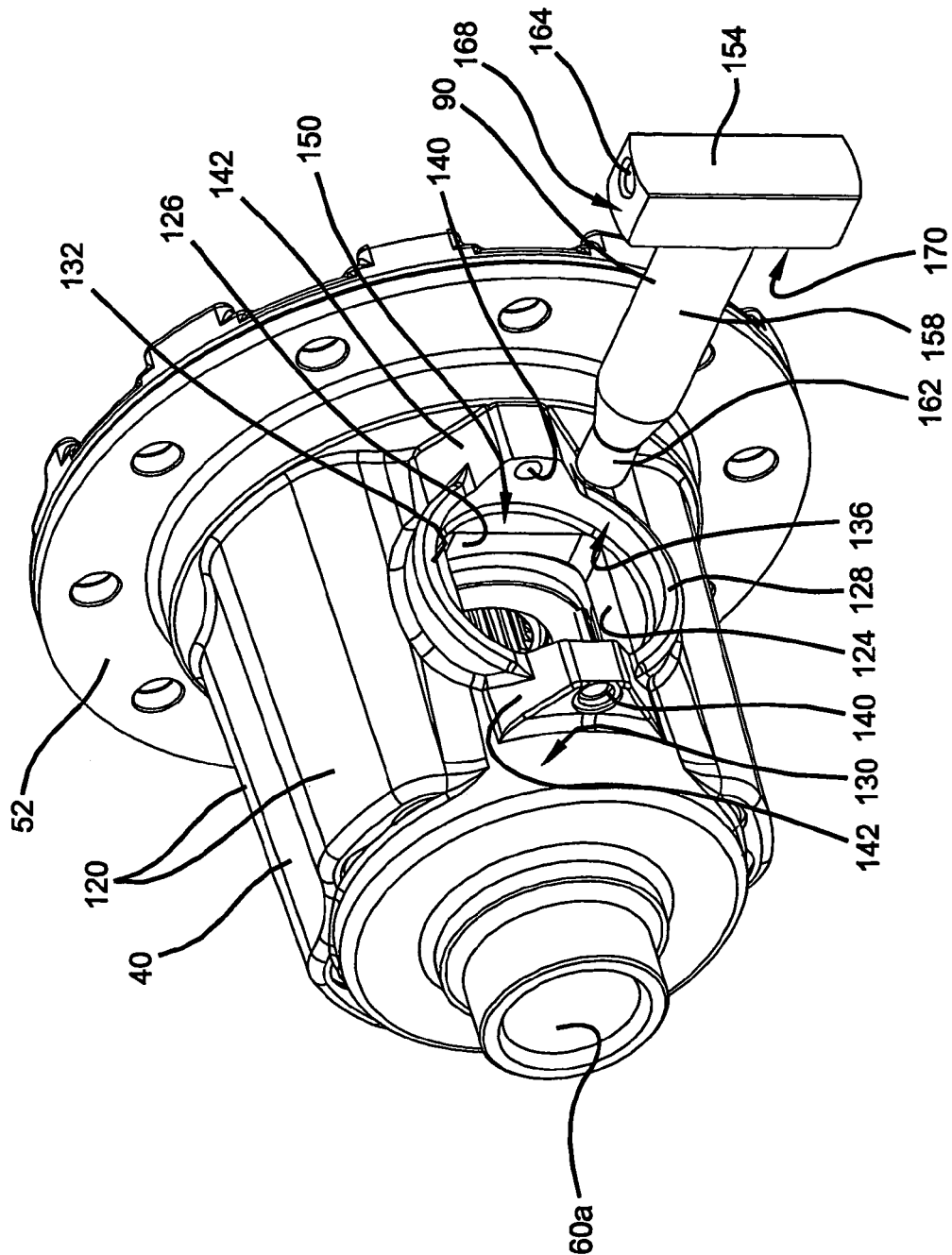
FIG. 6 is a perspective view of the differential assembly of FIG. 1 illustrating the cross pin assembly in an exploded condition.

With specific reference now to FIGS. 2b, 4 and 6, the configuration of the window opening 124 and the cooperation of the cross pin assembly 90 will be described. The window opening 124 includes an access passage 126 surrounded by a cylindrical boss 128 that may be formed on an outer surface 130 of the differential casing 40. The cylindrical boss 128 defines a counterbore 132 having an inner radial engaging surface 136. The cylindrical boss 128 includes a pair of mounting passages 140 formed on raised flanges 142 for receiving a fastener 146 (FIG. 8) therethrough. A ledge portion 150 extends at least partially about the window opening 124 inwardly of the cylindrical boss 128 on the differential casing 40.

The cross pin assembly 90 generally includes a proximal head portion 154, an intermediate shank portion 158 and a distal end portion 162. The head portion 154 defines a body that may extend generally transverse to the longitudinal axis of the cross pin assembly 90. The head portion 154 may include a throughbore 164 for receiving the fastener 146. The head portion 154 may include arcuate ends 168 that may be slidably disposed against the inner radial engaging surface 136 of the counterbore 132 during assembly. A bottom surface 170 of the head portion 154 locates against the ledge 150. The distal end portion 162 of the cross pin assembly 90 locates into a bore 172 formed into incorporated on the differential casing 40.

The cross pin assembly 90 may be unitarily formed or may comprise two or more components. In the example provided, the cross pin assembly 90 is a two-piece assembly comprising the proximal head portion 154, which may be pressed onto a discrete shank that defines both the intermediate shank portion 158 and the distal end portion 162. It is appreciated that while the distal end portion 162 of the cross pin assembly 90 is shown stepped down from the intermediate shank portion 158, the cross pin assembly 90 may comprise a uniform outer diameter. For example, an alternate pinion gear arrangement may be employed with a differential assembly providing enough space to accommodate a cross pin defining a consistent outer diameter.

Figure 7:
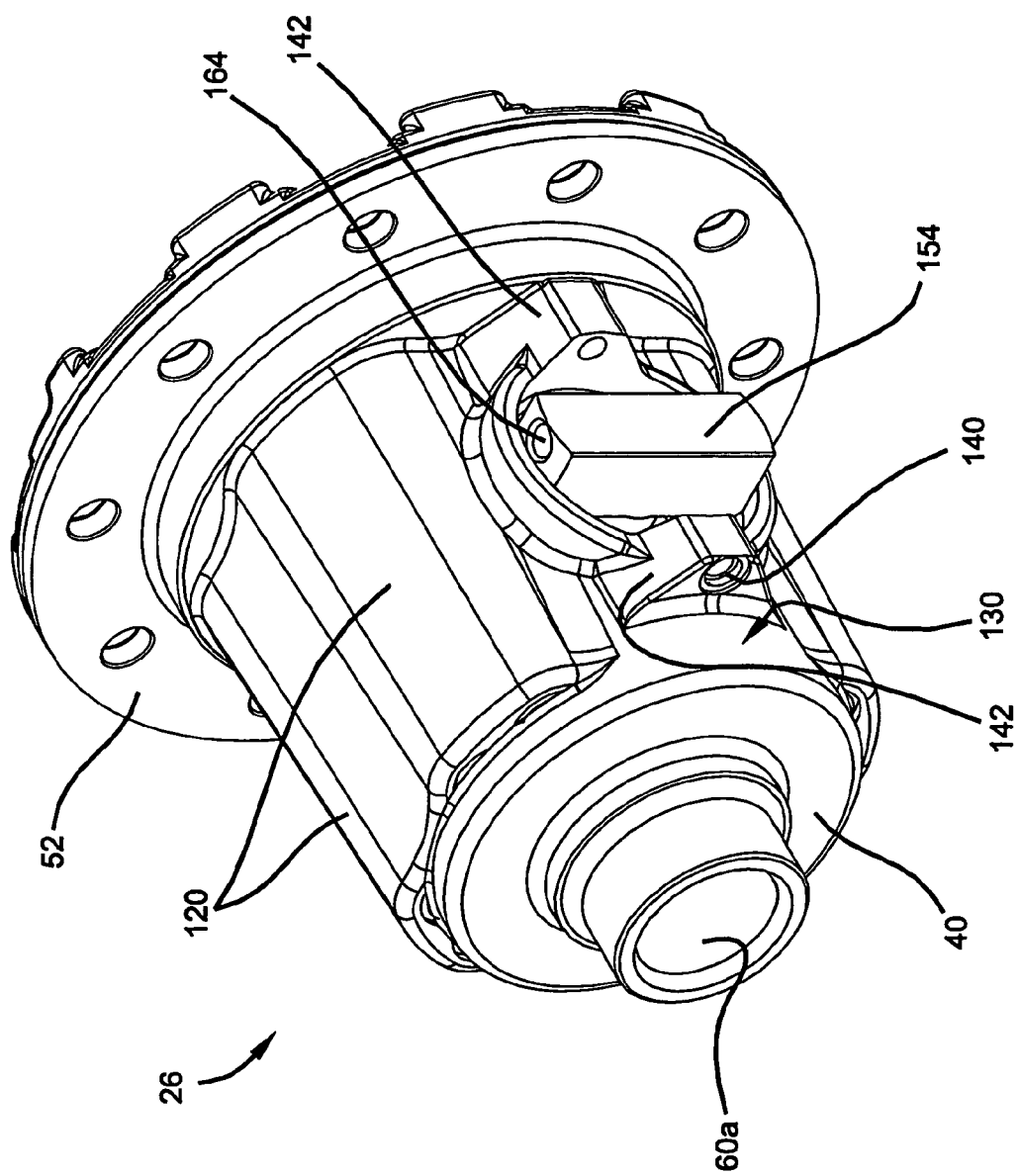
FIG. 7 is a perspective view of the differential assembly of FIG. 1 illustrating the cross pin assembly engaged to the cylindrical boss of the differential casing.

With reference to FIGS. 4 and 7, assembly of the cross pin assembly 90 into the differential casing 40 will now be described in greater detail. Once the C-clips 94 are properly located and the spacer 86 is located between the side gears 66a and 66b, the spacer passage 92 may be aligned opposite the window opening 124 on the differential casing 40. The distal end 162 and the intermediate portion 158 of the cross pin assembly 90 are inserted through the window opening 124 and the spacer passage 92. The distal end 162 of the cross pin assembly 90 may be located into the bore 172 on the differential case 40 opposite the window opening 124. The bore 172 and the counterbore 132 pilot the cross pin assembly 90 during installation. The proximal head portion 154 may be inserted in an orientation substantially transverse to the axis A of the differential casing 40. In this way, the head portion 154 of the cross pin assembly 90 will not interfere with the adjacent ring gear 38 (FIG. 1) during installation.

Figure 8:
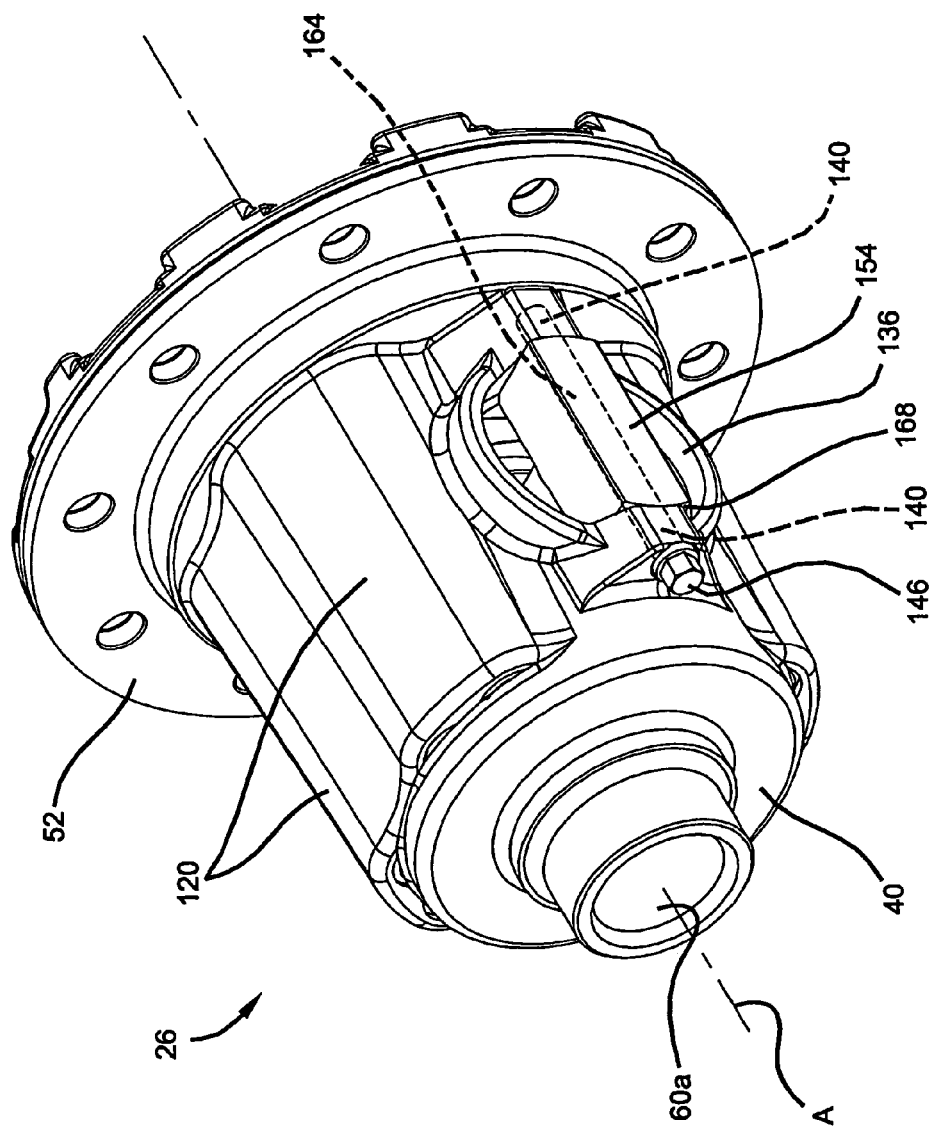
FIG. 8 is a perspective view of the differential assembly of FIG. 1 illustrating the cross pin assembly in an installed condition.

As the distal end 162 of the cross pin assembly 90 locates into the bore 172, the bottom surface 170 of the head portion 154 engages the ledge 150 between the counterbore 132 and the window opening 124. Similarly, the arcuate ends 168 of the proximal head 154 engage the inner radial engaging surface 136 of the counterbore 132. The proximal head portion 154 may then be rotated from the position shown in FIG. 7 into a substantially parallel orientation with the axis A of the differential 26 as illustrated in FIG. 8 until the throughbore 164 aligns with the mounting passages 140 of the raised flanges 142 on the cylindrical boss 128. During rotation of the proximal head portion 154, the inner radial engaging surface 136 pilots the arcuate ends 168 of the proximal head portion 154. Concurrently, the ledge 150 maintains the cross pin assembly 90 at the proper depth and assures that the throughbore 164 will be properly aligned with the mounting passages 140 of the raised flanges 142 on the cylindrical boss 128.

With the throughbore 164 and the mounting passages 140 aligned to one another, the fastener 146 may be inserted and secured. With the cross pin assembly 90 thus installed, relative movement between the cross pin assembly 90 and the differential casing 40 is essentially inhibited. As a result, the endplay of the axle shafts 44 and 45 (FIG. 1) may be controlled within desirable tolerances as a function of the diameter of the intermediate portion 158 of the cross pin assembly 90. The spacer 86 is disposed between the side-gears 68a and 68b and controls axial endplay of the side-gears 68a and 68b to keep the differential 26 from binding. The cross pin assembly 90 does not touch the spacer 86 in an assembled condition. The passage 92 in the spacer 86 defines a greater diameter than the diameter of the cross pin assembly 90. In this way, two distinct components are used to control the side gear endplay (namely, the spacer 86), and the axle shaft endplay (namely, the cross pin assembly 90). Such an arrangement allows for a desired amount of side gear endplay without affecting the axle shaft endplay.

The mass of the differential assembly 26 may be distributed to provide rotational balance. Specifically, the mass of the cylindrical boss 128 and the cross pin head 154 cooperate with the mass of the differential casing 40 around the pinion bores 110-116 and the mass of the pinion gears 100-106 to provide a rotationally balanced differential assembly 26. Stated another way, the mass of the several components of the differential assembly 26 is distributed about the rotational axis A so as to minimize or eliminate imbalance when the differential assembly 26 is rotated about the rotational axis A. It is appreciated that a counter weight may additionally, or alternatively be incorporated onto the differential casing 40 or the end cap 50 of the differential assembly 26.

The fastener 146 may be configured the same as an open differential such that the same axle assembly lines may be ran with both open differentials and helical gear differentials without changing tooling or torque wrench settings.

Figure 9:
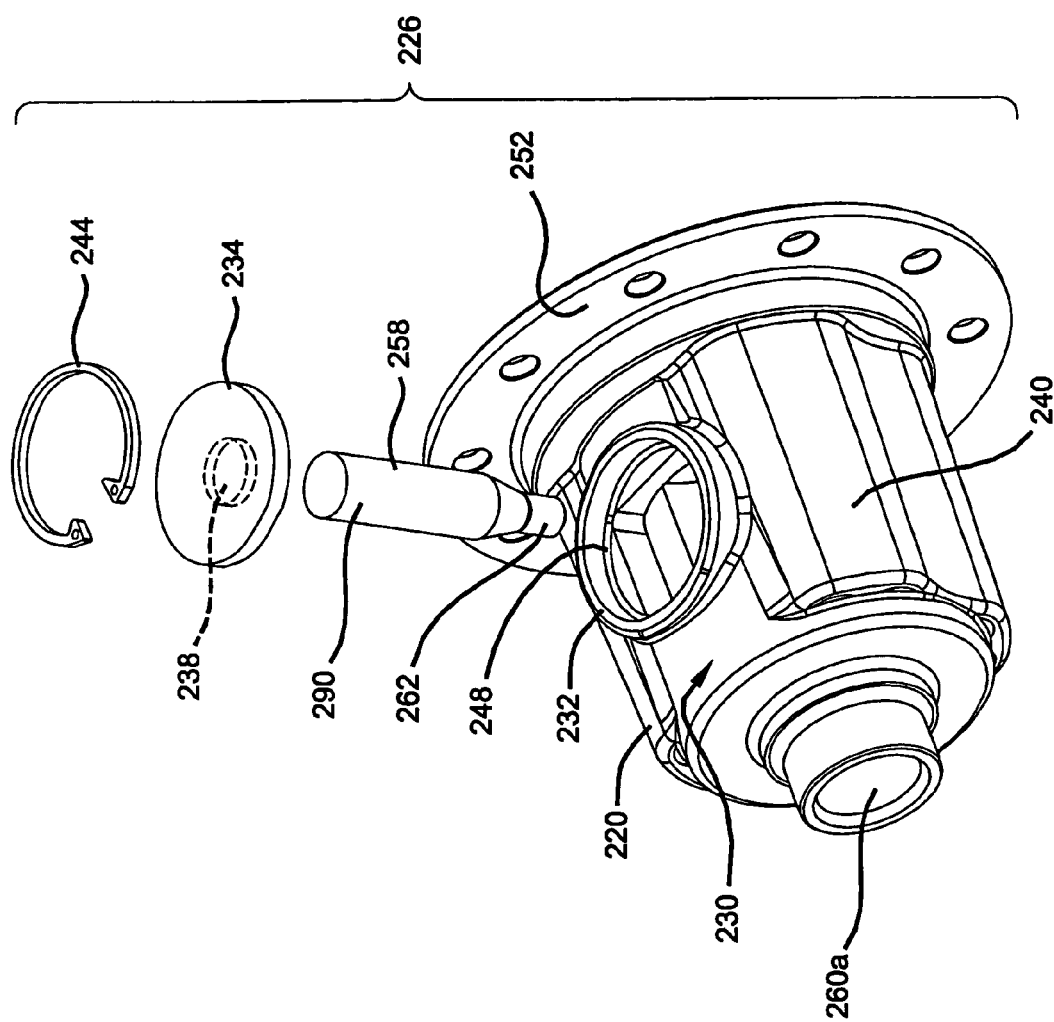
FIG. 9 is an exploded view of a differential assembly according to other features.

Turning now to FIG. 9, a differential assembly 226 according to other features is shown. The differential assembly 226 incorporates like components as the differential assembly 26 which are identified with a 200 prefix. The differential assembly 226 includes a cross pin 290 having an intermediate shank portion 258 and a distal end portion 262. The cross pin 290 may be adapted to be retained in the differential case 240 by a retaining disk 234. Specifically, the proximal end of the cross pin 290 may be adapted to recess into a counterbore 238 formed on an inboard surface of the retaining disk 234. A retaining ring 244 may be adapted to seat into a radial lip 248 arranged on the counterbore 232 in an assembled position.

Figure 10:
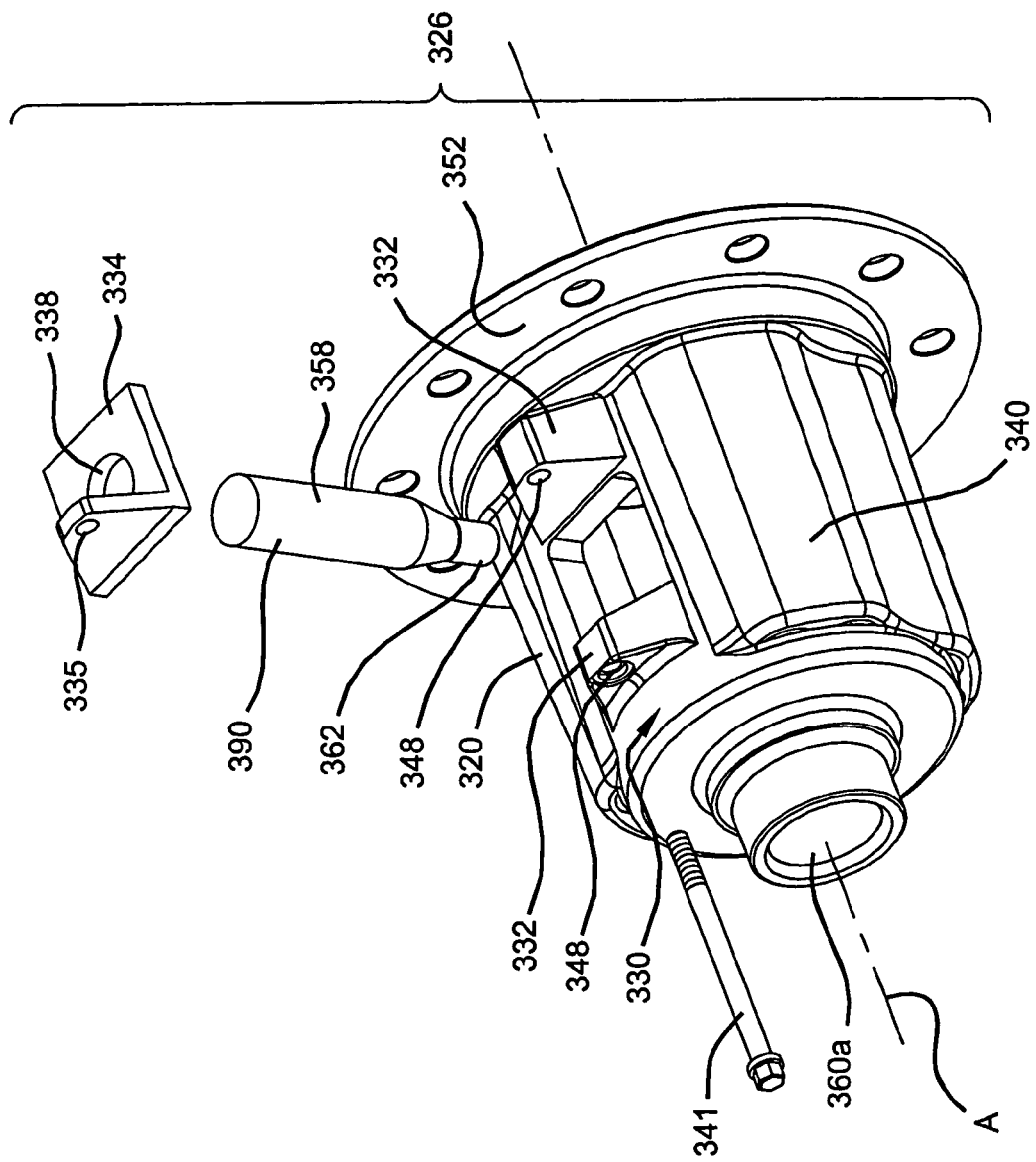
FIG. 10 is an exploded view of a differential assembly according to other features.

With reference now to FIG. 10, a differential assembly 326 according to additional features is shown. The differential assembly 326 incorporates like components as the differential assembly 26 which are identified with a 300 prefix. The differential assembly 326 includes a cross pin 390 having an intermediate shank portion 358 and a distal end portion 362. The cross pin 390 may be adapted to be retained in the differential case 340 by an L-plate 334 and a fastener 341. Specifically, a proximal end of the cross pin 390 may be adapted to pass through an opening 338 arranged on the L-plate 334. In this way, the L-plate 334 cooperates with the cross pin 390 to maintain the cross pin 390 in a substantially perpendicular orientation with axis A. The fastener 341 may be adapted to be secured through passages 348 incorporated in flange portions 332 and a passage 335 arranged in the L-plate 334. As a result, in an installed position, the fastener 341 bounds the proximal end of the cross pin 390 and maintains the cross pin 390 in an installed position.

Figure 11:
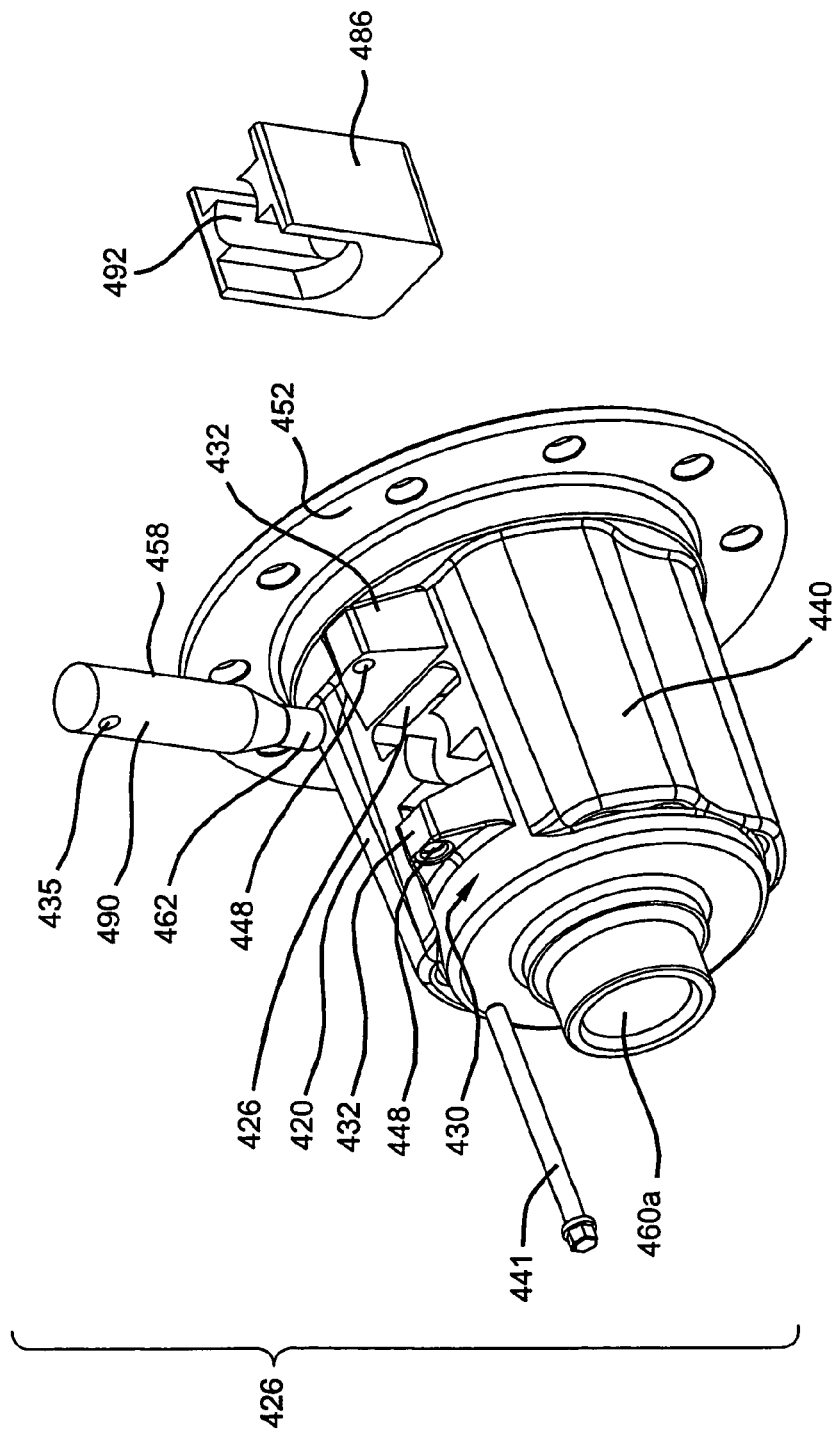
FIG. 11 is an exploded view of the differential assembly according to other features.

With reference now to FIG. 11, a differential assembly 426 according to additional features is shown. The differential assembly 426 incorporates like components as the differential assembly 26 which are identified with a 400 prefix. The differential assembly 426 includes a cross pin 490 having an intermediate shank portion 458 and a distal end portion 462. The cross pin 490 may be adapted to be retained in the differential casing 440 by a fastener 441. Specifically, the fastener 441 may be adapted to be secured through passages 448 incorporated in flange portions 432 and a passage 435 arranged in the cross pin 490.

An access passage 426 may be incorporated in the differential casing 440 and defines an access for installing C-clips 92 (FIG. 3). A spacer 486 according to additional features includes a passage 492 for accepting the cross pin 490 therethrough in an assembled position. The spacer 486 may be adapted to be installed into the differential casing 440 axially and be positioned between side gears as described herein.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A differential assembly for a vehicle equipped with axle shafts, the differential assembly comprising:
    a differential casing rotatable about an axis, the differential casing including a first pin aperture having a ledge;
    a ring gear fixed to the differential casing;
    a pair of side gears disposed within the differential casing and adapted to drivingly engage the axle shafts;
    a spacer disposed between the side gears, the spacer having a second pin aperture; and
    a cross pin having a body and a transversely extending head, the body being received into the first and second pin apertures, wherein the transversely extending head is positioned at a first orientation during receipt of the cross pin into the first pin aperture to clear the ring gear, the head engaging the ledge to limit axial movement of the cross pin relative to the differential casing, the transversely extending head being rotated to a second orientation when coupled to the differential casing;
    wherein the cross pin is adapted to limit movement of the axle shafts in a direction toward one another and the spacer limits movement of the side gears toward one another.

2. The differential assembly of claim 1, wherein the spacer is substantially "U-shaped."

3. The differential assembly of claim 1, wherein the first orientation and the second orientation differ by approximately 90 degrees.

4. The differential assembly of claim 3, wherein an end of the cross pin opposite the transversely extending head is received in another aperture formed in the differential casing.

5. The differential assembly of claim 1, wherein a threaded fastener removably couples the cross pin to the differential casing and extends substantially perpendicular to an axis of insertion of the cross pin within the differential casing.

6. The differential assembly of claim 5, wherein the differential casing includes radially extending spaced apart flanges having apertures in receipt of the threaded fastener.

7. A differential assembly for a vehicle having axle shafts, comprising:
    a differential casing rotatable about an axis, the differential casing including a first aperture defined by two discontinuous arced surfaces and two slots, each slot being in communication with an end of each arced surface;
    a pair of side gears disposed within the differential casing;
    a spacer disposed between the side gears, the spacer having a second aperture; and
    a cross pin received by the first and second apertures;
    wherein the cross pin is engaged with the two arced surfaces and fixedly but removably coupled to the differential casing, wherein the slots are sized to receive clips adapted to restrict axial movement of the axle shafts relative to the differential casing.

8. The differential assembly of claim 7, wherein one end of the cross pin is received by the first aperture and a second end of the cross pin is received in another aperture formed in the differential casing.

9. The differential assembly of claim 7, wherein a common uninterrupted sidewall defines an outer periphery of the two slots and the two arced surfaces.

10. The differential assembly of claim 7, further including a fastener extending through an aperture formed in the cross pin and engaged with the differential casing.

11. The differential assembly of claim 10, wherein the differential casing includes radially extending spaced apart flanges having apertures in receipt of the fastener.

12. The differential assembly of claim 11, wherein the fasteners extend along an axis substantially parallel to the axis of rotation of the differential casing.

13. A differential assembly for a vehicle equipped with axle shafts, the differential assembly comprising:
    a differential casing rotatable about an axis, the differential casing including a counterbore having a ledge;
    a pair of side gears disposed within the differential casing and adapted to drivingly engage the axle shafts;
    a spacer disposed between the side gears, the spacer having a pin aperture;
    a cross pin received into the counterbore and the pin aperture, and
    a retaining disk having a recess in receipt of a first end of the cross pin, the retaining disk engaging the ledge and being removably fixed to the differential casing by a fastener.

14. The differential assembly of claim 13, wherein the cross pin is spaced apart from the differential casing.

15. The differential assembly of claim 13, wherein the fastener is a ring retaining the disk within the counterbore.

16. The differential assembly of claim 13, wherein a second end of the cross pin is received within an aperture formed in the differential casing.

* * * * *